May 24, 1927.
A. FOLTZ
HOUSING FOR PIPE CONNECTIONS
Filed Oct. 4, 1922
1,629,693
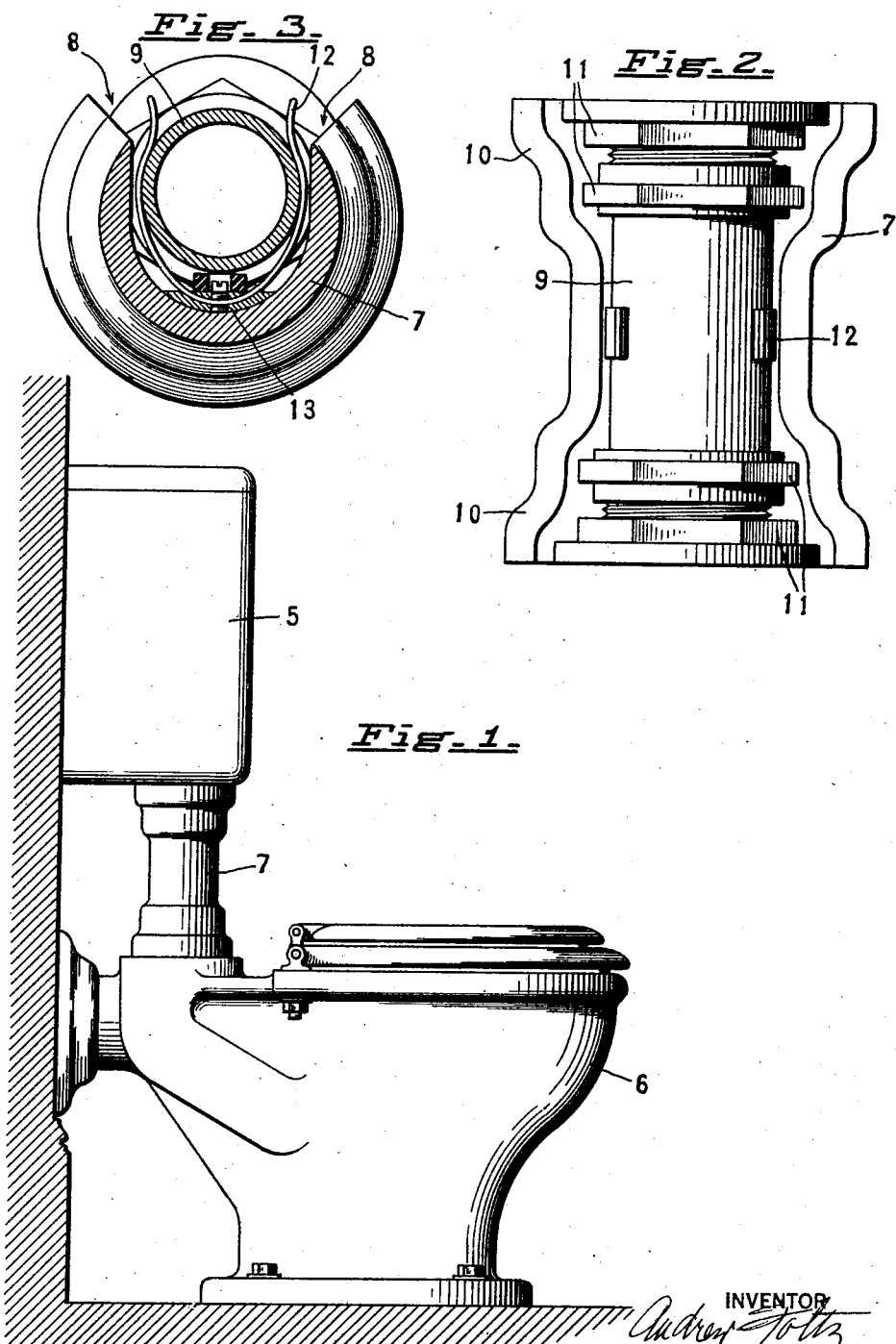

Patented May 24, 1927.

1,629,693

UNITED STATES PATENT OFFICE.

ANDREW FOLTZ, OF LAMBERTVILLE, NEW JERSEY.

HOUSING FOR PIPE CONNECTIONS.

Application filed October 4, 1922. Serial No. 592,217.

This invention relates generally to housings for pipe connections used in exposed plumbing.

An object of the invention is to provide a sanitary and attractive device for the purpose which can be readily placed in covering position on an exposed pipe or other unsightly connection without necessitating the uncoupling or disassembling of the connection.

The invention consists of a housing or casing formed of porcelain or other suitable material and having a slot or opening along one side by which it may be pressed transversely of the pipe or connection into position. The casing or housing is particularly useful for enclosing the unsightly flush pipe connection between a flush tank and bowl and will be particularly described in that situation. In order to hold the housing in place on the enclosed pipe a suitable concealed spring is employed which clamps the pipe and not only holds the housing in place but serves to center it with relation to the pipe.

In the drawings, in which a preferred embodiment of the invention has been selected for illustration, Figure 1 is a view in side elevation of a plumbing installation including a pipe housing embodying the invention.

Figure 2 is an enlarged detail view showing the relation of the housing and the parts enclosed thereby.

Figure 3 is a view in cross-section of the parts shown in Figure 2.

Referring to the drawings, in Figure 1 is shown a plumbing installation including a supply or flush tank 5 and a bowl 6, the pipe connection between the tank and bowl being encased or enclosed in a housing device 7 constructed in accordance with the invention.

Referring to Figures 2 and 3 of the drawing the housing 7 will be seen to consist of an elongated hollow member having an opening 8 in one side wide enough to receive the flush pipe connection 9 extending between the tank 5 and bowl 6. The expanded terminal members 10 of the housing 7 are in turn adapted to receive in the hollow thereof the screw fittings 11 which are used to provide a water-tight connection between the pipe 9 and the tank and bowl.

It will be seen that the housing member 7 by reason of the slot or opening 8 in one of its sides can be pressed transversely into housing position on the flush pipe 9 without necessitating the uncoupling of the pipe. This facility of operation in placing the housing in position is equaled by the readiness with which the housing is removed by a simple lateral movement to provide access to the flush pipe for any purpose.

In order to hold the housing in place on the pipe 9 a clamping spring 12, U-shaped in formation is attached at 13 to the inner wall of the housing with its arms extending in flanking and clamping relation to the interposed pipe 9 as indicated in Figure 3 of the drawings. The spring 12 not only holds the housing in place on the pipe but also serves to center the housing with relation to the pipe and preserve the symmetry and balance of the related parts.

The housing may be made of porcelain or other easily cleaned vitreous or other material and it will be clear that its use obviates the difficulty of cleaning and otherwise preserving the appearance of metal flush pipes exposed to view.

What I claim is:—

1. A housing for flush pipe connections comprising a hollow member open from end to end through one side wall thereof to detachably connect said housing to the pipe, and a clamping member mounted in the hollow member to engage the pipe and hold the housing in position.

2. A housing for flush pipe connections comprising a hollow member open from end to end along one side wall thereof to detachably connect said housing to the pipe whereby the housing may be pressed transversely into housing relation to the pipe, and a U-shaped spring clamping member mounted in the housing and having its arms arranged to extend in flanking and clamping relation to the pipe to hold the housing in place and center it on the pipe.

3. A housing for flush pipe connections comprising a hollow member formed of vitreous material and having a length equal to the combined length of the flush pipe and its end fittings, said hollow member having enlarged end portions and provided with an opening in one side extending from end to end of the member whereby the hollow member may be pressed to housing relation to the flush pipe and its end fittings, and a spring clamping member in said housing for engaging the pipe and holding the housing in place.

In testimony whereof I affix my signature.

ANDREW FOLTZ.